United States Patent
Bourne

(10) Patent No.: US 11,222,072 B1
(45) Date of Patent: Jan. 11, 2022

(54) GRAPH DATABASE MANAGEMENT SYSTEM AND METHOD FOR A DISTRIBUTED COMPUTING ENVIRONMENT

(71) Applicant: VCE Company, LLC, Richardson, TX (US)

(72) Inventor: Geoffrey D. Bourne, Allen, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 673 days.

(21) Appl. No.: 14/802,733

(22) Filed: Jul. 17, 2015

(51) Int. Cl.
*G06F 16/901* (2019.01)
*G06F 16/21* (2019.01)
*G06F 16/22* (2019.01)

(52) U.S. Cl.
CPC ........ *G06F 16/9024* (2019.01); *G06F 16/211* (2019.01); *G06F 16/2237* (2019.01)

(58) Field of Classification Search
CPC ........... G06F 17/30958; G06F 16/9024; G06F 16/2237; G06F 16/211
USPC ........................................................ 707/798
See application file for complete search history.

(56) References Cited

U.S. PATENT DOCUMENTS

| | | | | |
|---|---|---|---|---|
| 8,239,847 B2 * | 8/2012 | Yu | ........................ | H04L 12/44 717/149 |
| 8,824,274 B1 * | 9/2014 | Medved | .................. | H04L 47/20 370/217 |
| 9,087,088 B1 * | 7/2015 | Bose | ........................ | G06F 16/22 |
| 9,154,371 B1 * | 10/2015 | Srinivasan | ............ | H04L 47/125 |
| 9,576,020 B1 * | 2/2017 | Patterson | ............ | G06F 16/9024 |
| 9,697,254 B2 * | 7/2017 | Paradies | ................ | G06F 16/221 |
| 10,037,368 B1 * | 7/2018 | Nandyalam | ......... | G06F 16/8358 |
| 2002/0021669 A1 * | 2/2002 | Kunito | ................ | H04L 67/1021 370/235 |
| 2005/0182975 A1 * | 8/2005 | Guo | .................. | H04W 52/0216 713/300 |
| 2008/0098479 A1 * | 4/2008 | O'Rourke | ........... | H04L 63/1433 726/25 |
| 2008/0256241 A1 * | 10/2008 | Graser | .................. | G06Q 10/10 709/226 |
| 2008/0313251 A1 * | 12/2008 | Ma | ........................ | G06Q 30/02 708/290 |
| 2009/0216867 A1 * | 8/2009 | Pusateri | ................ | H04L 41/085 709/222 |
| 2009/0225082 A1 * | 9/2009 | Hargrove | .............. | G06T 11/206 345/440 |

(Continued)

*Primary Examiner* — Ashish Thomas
*Assistant Examiner* — Nargis Sultana
(74) *Attorney, Agent, or Firm* — Polsinelli PC

(57) ABSTRACT

A graph database management system includes a computing system in communication with a distributed computing environment comprising a plurality of elements and a database that stores element records associated with corresponding elements of the distributed computing environment. The computing system generates a graph database having a plurality of vertices representing the element records of the distributed computing environment and at least one edge representing a specified relationship between at least one pair of the element records. Thereafter, the computing system may receive a request to view the vertices associated with the at least one pair of element records and their associated edge, and facilitate the display of the vertices and their associated edge on a display in response to the request.

14 Claims, 10 Drawing Sheets

(56) References Cited

U.S. PATENT DOCUMENTS

| | | | | |
|---|---|---|---|---|
| 2009/0303239 A1* | 12/2009 | Ang | G06F 16/248 | 345/440 |
| 2011/0172990 A1* | 7/2011 | Jagannathan | H04L 67/327 | 704/9 |
| 2011/0173189 A1* | 7/2011 | Singh | G06F 16/9024 | 707/722 |
| 2011/0268364 A1* | 11/2011 | Hido | G06F 16/9024 | 382/218 |
| 2011/0316854 A1* | 12/2011 | Vandrovec | G06T 17/20 | 345/420 |
| 2012/0209871 A1* | 8/2012 | Lai | G06F 16/907 | 707/769 |
| 2012/0317142 A1* | 12/2012 | Broecheler | G06F 16/9024 | 707/770 |
| 2013/0024479 A1* | 1/2013 | Gong | G06F 9/5066 | 707/798 |
| 2013/0055091 A1* | 2/2013 | Dutta | G06F 3/04842 | 715/736 |
| 2013/0124538 A1* | 5/2013 | Lee | H04L 63/105 | 707/749 |
| 2013/0159288 A1* | 6/2013 | Nikankin | G06Q 40/02 | 707/722 |
| 2013/0246731 A1* | 9/2013 | Lee | G06F 12/0284 | 711/170 |
| 2014/0019490 A1* | 1/2014 | Roy | G06F 16/2228 | 707/798 |
| 2014/0136553 A1* | 5/2014 | Jacob | G06F 16/9024 | 707/754 |
| 2014/0143280 A1* | 5/2014 | Duan | G06F 16/211 | 707/798 |
| 2014/0172810 A1* | 6/2014 | Paradies | G06F 16/9024 | 707/705 |
| 2014/0250140 A1* | 9/2014 | Guzenda | G06F 16/28 | 707/758 |
| 2014/0292765 A1* | 10/2014 | Maruyama | G06T 11/206 | 345/440 |
| 2014/0297621 A1* | 10/2014 | Hu | G06F 16/24545 | 707/722 |
| 2014/0372458 A1* | 12/2014 | Jurca | G06F 16/9024 | 707/754 |
| 2015/0026158 A1* | 1/2015 | Jin | G06F 16/90335 | 707/722 |
| 2015/0066989 A1* | 3/2015 | Yu | G06F 16/9024 | 707/798 |
| 2015/0120783 A1* | 4/2015 | Talmor | H04L 67/10 | 707/798 |
| 2015/0124644 A1* | 5/2015 | Pani | H04L 61/2007 | 370/254 |
| 2015/0161229 A1* | 6/2015 | Davies | G06F 16/285 | 707/737 |
| 2015/0169758 A1* | 6/2015 | Assom | G06F 16/36 | 707/603 |
| 2015/0220553 A1* | 8/2015 | Poon | G06F 16/2452 | 707/722 |
| 2015/0227582 A1* | 8/2015 | Gu | G06F 16/958 | 707/713 |
| 2015/0302075 A1* | 10/2015 | Schechter | G06F 16/13 | 707/641 |
| 2015/0347421 A1* | 12/2015 | Steiner | G06F 16/282 | 707/798 |
| 2015/0370919 A1* | 12/2015 | Bornhoevd | G06F 16/9024 | 707/798 |
| 2015/0381515 A1* | 12/2015 | Mattson | H04L 47/70 | 707/609 |
| 2016/0004787 A1* | 1/2016 | Shinkuma | G06F 16/9024 | 707/798 |
| 2016/0026677 A1* | 1/2016 | Feo | G06F 16/9024 | 707/718 |
| 2016/0057733 A1* | 2/2016 | Grandillo | H04H 20/423 | 370/252 |
| 2016/0063037 A1* | 3/2016 | Savkli | G06F 16/9024 | 707/722 |
| 2016/0063100 A1* | 3/2016 | Anton | G06F 16/2219 | 707/739 |
| 2016/0085527 A1* | 3/2016 | de Lima Ottoni | G06F 8/443 | 717/157 |
| 2016/0119204 A1* | 4/2016 | Murasato | H04L 41/22 | 715/735 |
| 2016/0179883 A1* | 6/2016 | Chen | G06F 16/211 | 707/714 |
| 2016/0342708 A1* | 11/2016 | Fokoue-Nkoutche | G06F 16/2255 | |
| 2016/0350093 A1* | 12/2016 | Walker | H04L 9/3247 | |
| 2016/0350367 A1* | 12/2016 | Fischer | G06F 16/258 | |
| 2017/0075746 A1* | 3/2017 | Nomura | G06F 11/0721 | |
| 2017/0177737 A9* | 6/2017 | Hu | G06F 16/24573 | |
| 2018/0173755 A1* | 6/2018 | Xia | G06F 16/24537 | |

\* cited by examiner

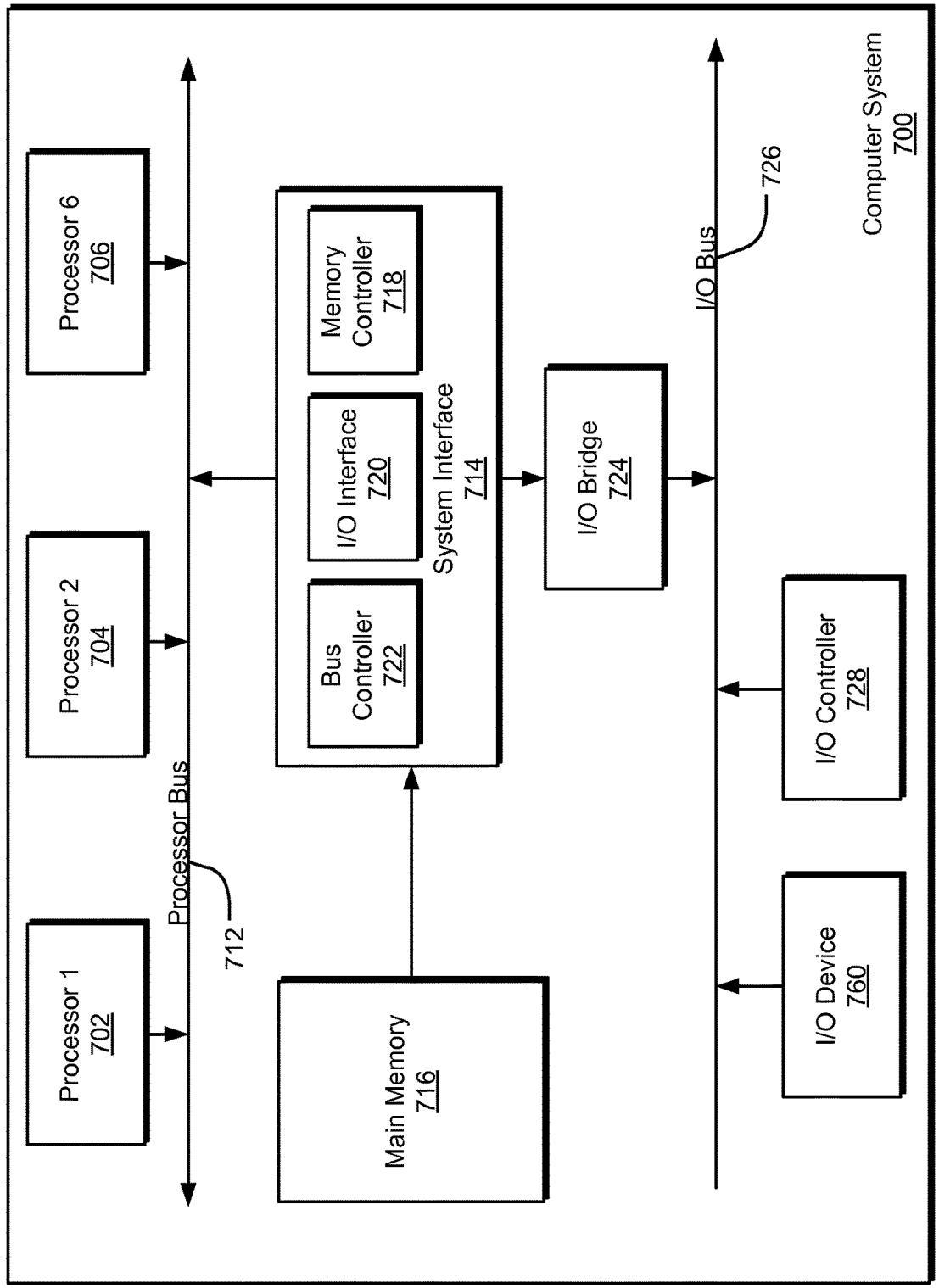

GRAPH DATABASE MANAGEMENT SYSTEM AND METHOD FOR A DISTRIBUTED COMPUTING ENVIRONMENT

TECHNICAL FIELD

Aspects of the present disclosure relate to computing devices and, in particular, to a graph database management system and method for a distributed computing environment.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, distributed computing environments that may include virtual computing environments were introduced and that provide a standardized package of components combined into a single, optimized computing solution. These distributed computing environments typically offer a relatively high level of customization for applications by distributing the workload of applications over multiple resources while alleviating the need to manage specific physical requirements of the underlying physical structure on which the resources are executed.

SUMMARY

According to one aspect of the present disclosure, a graph database management system includes a computing system in communication with a distributed computing environment comprising a plurality of elements and a database that stores element records associated with corresponding elements of the distributed computing environment. The computing system generates a graph database having a plurality of vertices representing the element records of the distributed computing environment and at least one edge representing a specified relationship between at least one pair of the element records. Thereafter, the computing system may receive a request to view the vertices associated with the at least one pair of element records and their associated edge, and facilitate the display of the vertices and their associated edge on a display in response to the request.

BRIEF DESCRIPTION OF THE DRAWINGS

The various features and advantages of the technology of the present disclosure will be apparent from the following description of particular embodiments of those technologies, as illustrated in the accompanying drawings. In the drawings the like reference characters may refer to the same parts throughout the different views. The drawings depict only typical embodiments of the present disclosure and, therefore, are not to be considered limiting in scope.

FIG. 7 illustrates an example computer system according to one embodiment of the present disclosure.

DETAILED DESCRIPTION

Embodiments of the present disclosure describe a graph database management system and method for a distributed computing environment that generates a graph database according to a specified relationship between each element and other elements in the distributed computing environment. Whereas currently implemented distributed computing environments are often provided with numerous elements (e.g., sometimes over 100,000 elements) whose relationship among each other may change on a frequent ongoing basis, maintenance of such distributed computing environments may be difficult to provide when the operation of certain elements may be tightly coupled to the operation of other elements. Embodiments of the present disclosure provide a solution to this problem, among other problems, by providing a system and method in which information associated with the relationship of certain elements in the distributed computing environment relative to other elements may be retained and viewed in a manner so that those relationships may be easily and quickly identified.

Distributed computing environments have provided an efficient platform for the execution of relatively large and complex applications and services requiring a relatively high level of availability and performance. For example, an application may be deployed on a distributed computing environment by allocating multiple elements of the distributed computing environment to handle its workload without substantial regard to how those elements are managed and/or maintained. Additionally, the distributed computing environment may provide a relatively high level of availability for the deployed application by automatically migrating the use of certain elements to other elements when those elements fail. Nevertheless, this flexible deployment of elements often causes an undue burden due to the relatively high level of coupling among various elements of the distributed computing environment. For example, many distributed computing environments are provided with a virtualized computing environment including compute resources that are ideally adapted for processing algorithms of an application, network elements that are ideally adapted for communication among the elements, and storage elements that are ideally adapted for persistency of data used by the application. As such, a set of elements used for executing a given application may be highly coupled to one another such that the performance of one or a few elements may depend upon the operation of other elements to a relatively high degree. Currently implemented management systems for distributed computing environments, however, do not provide a means to store and analyze information associated with relationships among certain elements for efficient management of the elements that execute those applications.

Figure 1A:
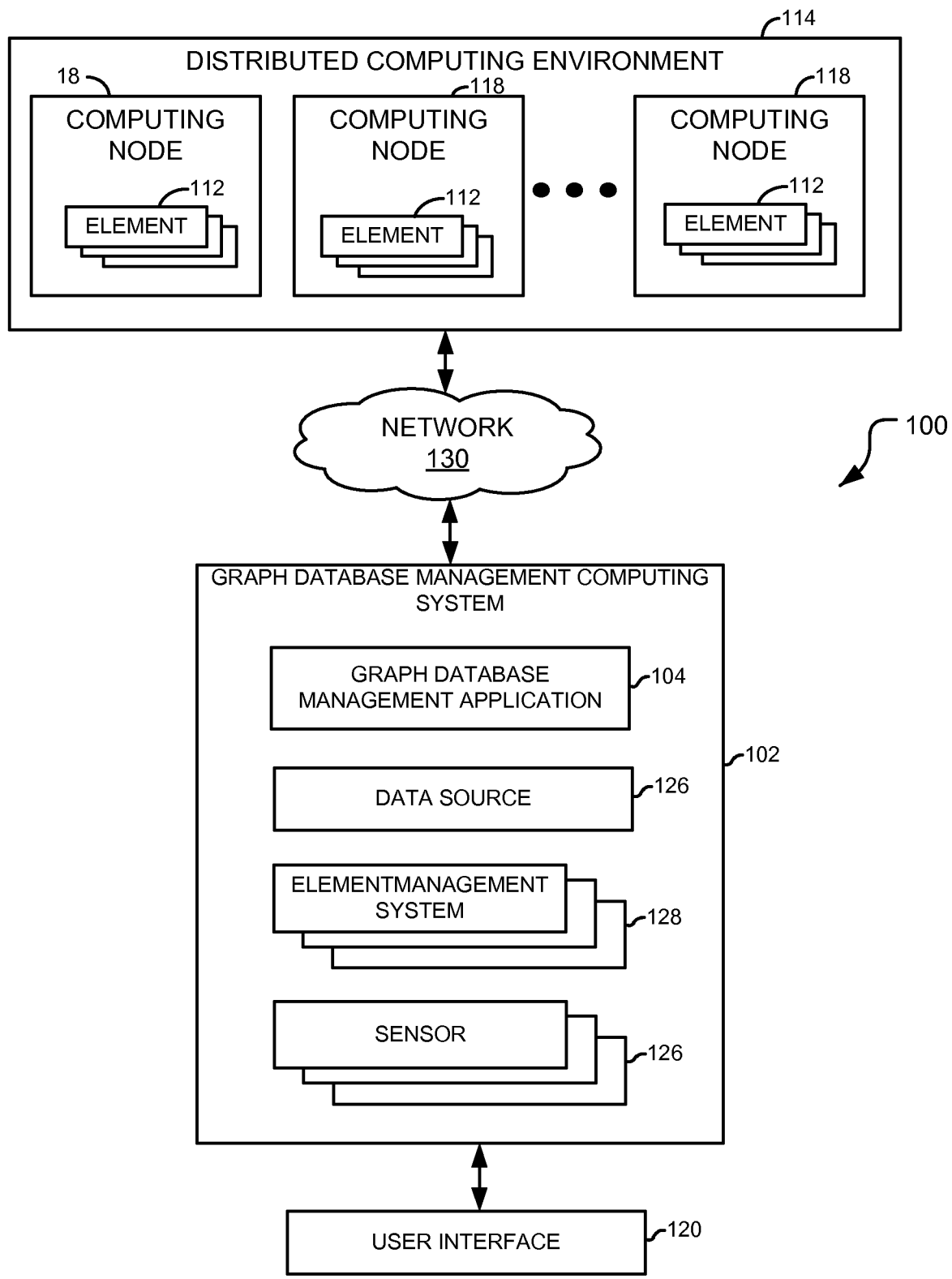
FIG. 1A illustrates an example graph database management system for a distributed computing environment according to one embodiment of the present disclosure.
Figure 1B:
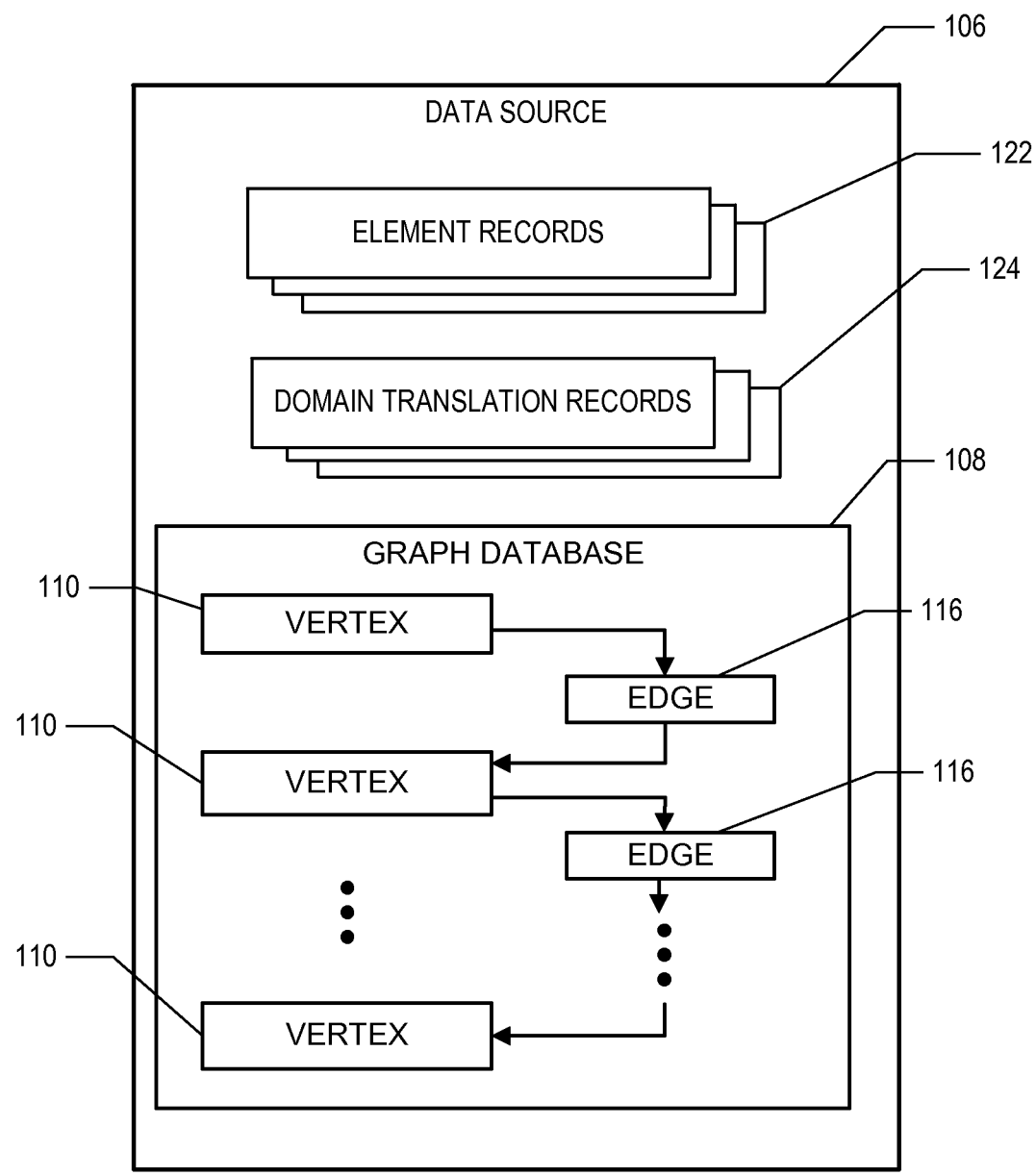
FIG. 1B illustrates an example data source that may be used with the graph database management system according to one embodiment of the present disclosure.

FIGS. 1A and 1B illustrate an example graph database management system 100 according to one embodiment of the present disclosure. The system 100 includes a graph database management computing system 102 having an graph database management application 104 and a data source 106 that stores, among other things, a graph database 108 including vertices 110 representing the elements 112 of a distributed computing environment 114, and edges 116 representing the relationship between those elements 112. The vertices 110 along with their associated edges 116 may then be viewed by a user via a user interface 120.

In general, a graph database includes vertices representing a set of entities, which in this particular case are elements 112 of the distributed computing environment 114, with edges 116 indicating relationships between the vertices. Vertices and edges include named properties which serve both to identify specific instances of each vertex and to provide for their recall from arbitrary locations in the graph, when indexed. For example, the employee ID of an employee could be indexed and used as a starting point in a graph to identify the relationships of an employee to other employees, such as manager, co-workers, human resources representative, and the like.

According to embodiments of the present disclosure, the graph database 108 provides a mechanism to natively represent relational content between the elements 112 of the distributed computing environment 114. In certain cases, the graph database 108 may provide for visibility into multi-step (e.g., chained) relationships, such as one that may be established from a first element to a third element given that the first element is related to a second element, and the second element is related to the third element. For example, a certain physical host of a virtualized computing environment may be related to a virtual machine executed on that physical host, while the virtual machine may be related to an operating system executed on that virtual machine. Thus, operation of the operating system may be related to the physical machine, an aspect that may be important for management of the operating system. As another example, the graph database 108 may incrementally retain information about related physical or logical elements, such as a disk enclosure, the disks enclosed within the disk enclosure, and any software elements allocated to those disks.

The relationships between the elements 112 may include physical relationships or logical relationships. Examples of physical relationships include a physical hard drive element 112 disposed in a disk enclosure element 112, a blade element 112 configured in a blade array enclosure element 112, and a cabling or fabric connection between two elements 112. Examples of logical relationships may include a virtual machine element 112 configured on its respective host element 112, one or more communication port elements 112 allocated to a particular virtual machine element 112, and an allotment of a disk allocation (e.g., a disk partition) to a software process.

The application 104 may discover information about the elements 112 and store the information as element records 122 in the data source 106. In one embodiment, the application 104 discovers and records information about the elements 112 along with their respective relationships relative to each other using one or more element management systems 126 and/or one or more sensors 128. That is, the application 104 may discover and record information about the elements 112 using an intermediary mechanism, such as one that manages the operation of the elements 112 of the distributed computing environment 114, which may include, for example, provisioning elements, de-provisioning elements, configuring one or more operational parameters on each element 112, and the like. Examples, of such element management systems 126 include a vSphere™ software suite, a VMware™ software suite, and/or a vCenter™ software suite, which are available from VMware Corporation in Palo Alto, Calif. Another example of such an element management system includes a Vision™ software suite available from VCE Corporation in Richardson, Tex. The vSphere™, VMware™, vCenter™, and Vision™ element management systems may be useful for obtaining element information that spans multiple differing technologies and vendor brand types. In certain cases, the application 104 may discover and record element information using one or more element management systems 126 that are ideally suited for use with a particular vendor, such as a Cisco Unified Computing System (UCS) manager provided by Cisco Systems, Inc., of San Jose, Calif.

In another embodiment, the application 104 may obtain relationship information for certain elements 112 using a sensor 128, such as a network analyzer that is sometimes referred to as a sniffer. The application 104 may monitor a network analyzer, such as a sniffer device, to identify the presence of any communication links between elements 112. For example, the application 104 may collect element information from a certain element 112 by analyzing Internet protocol (IP) packets transmitted by that element and deciphering related information according to at least one of a destination address, a source address, and a port address included in the IP packets. In a particular example, the application 104 may determine that a relationship exists between a compute element 112 and a storage element 112 using source address and destination address information included in a series of packets transmitted between the two, and subsequently generate vertices representing both elements with an edge representing the communication link.

In one embodiment, the application 104 uses a graph database software program to organize and store vertices 110 and edges 116 representing the elements 112 and relationships, respectively, of the distributed computing environment 114. One example of a suitable graph database software program that may be implemented with the teachings of the present disclosure includes a Titan™ graph database software program, which is released under an open source license from the Apache Software Foundation in Forest Hill, Md. The Titan™ graph database is written using Java code, and is a distributed, real-time, scalable transactional database that allows simultaneous use by multiple users. Nevertheless, other graph database software programs may be implemented with the application 104 without departing from the spirit or scope of the present disclosure. In another embodiment, the graph data software program may be accessed using a search engine, such as an Elasticsearch™ search engine, which is released under an open source license from the Apache Software Foundation in Forest Hill, Md.

The Titan™ graph database stores each vertex 110 as an unambiguous tuple of identifiers including an element type, an identifier type, and an identifier value. An edge 116 is identified by the vertices 110 at each end and the association type of that edge. When collecting an element 112 and its associated elements 112 into the graph model, first a vertex 110 is located with the known tuple. Only if a vertex 110 did not already exist, is a vertex 110 created and assigned to that tuple. After the vertex 110 is created and tuples assigned, the content of those tuples will generally not change, thus forming a time-invariant storage system. The application 104 may generate such tuples to form the vertices 110 and associated edges 116 of the graph database 108 such that the properties of each vertex is indexed and available for retrieval.

The elements 112 may be provided by one or more computing nodes 118 configured in the distributed computing environment 114. In most cases, the elements 112 generally refer to computing devices that perform some function for the overall operation of the distributed computing environment 114, while the nodes 118 generally refer to physically distinct structures (e.g., computing racks) that house the elements 112. Examples of such computing devices may include, for example, blade computing devices, laptop or notebook computers, workstations, tablet computers, and the like, while the computing nodes 118 may include complex computing structures, such as clusters, unified computing systems, fabric-based computing systems, and dynamic infrastructures. The computing nodes 118 may also include other communication devices, such as switches, routers, firewall appliances, or other communication device that facilitates communication among multiple other computing nodes 118. Each computing node 118 may also include a distributed computing system, such as one implemented with one or more storage arrays, network element, compute devices, and/or any combination thereof. For example, a computing node 118 may comprise one or more converged infrastructures configured in the distributed computing environment 114.

The graph database management application computing system 102 and the distributed computing environment 114 communicate with one another using a communications network 130. Nevertheless, the graph database management application computing system 102 and the distributed computing environment 114 may communicate with one another in any suitable manner. For example, the graph database management application computing system 102 and the distributed computing environment 114 may communicate with each other using wireless and/or wired communications. In one embodiment, the graph database management application computing system 102 and the distributed computing environment 114 communicates with one another using a communication network 130, such as the Internet, an intranet, or another wired and/or wireless communication network. In another embodiment, the graph database management application computing system 102 and the distributed computing environment 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the graph database management application computing system 102 and the distributed computing environment 114 may communicate with one another without the use of a separate and a distinct network.

Figure 2A:
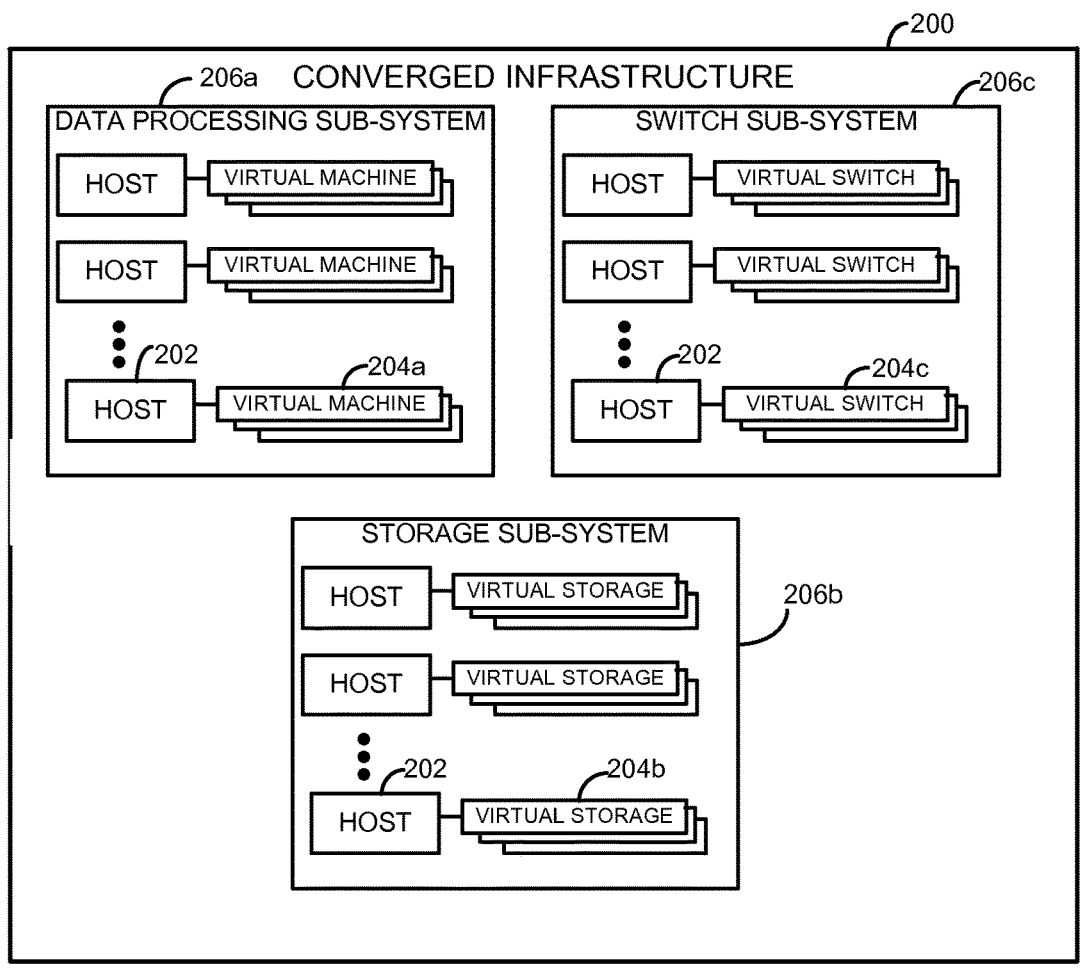
FIGS. 2A and 2B illustrate an example converged infrastructure that may be implemented as a computing node of the distributed computing environment according to one embodiment of the present disclosure.
Figure 2B:
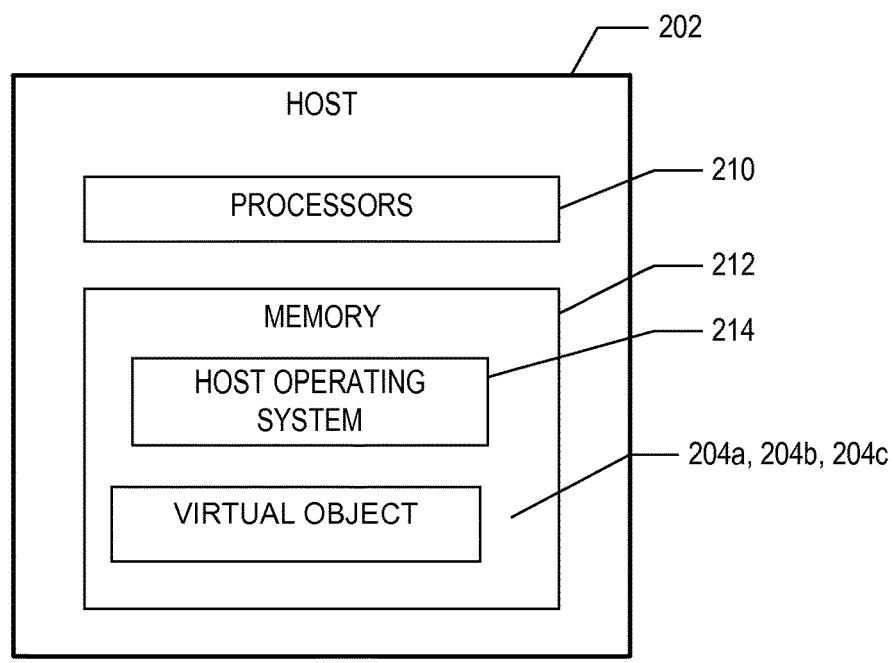

FIGS. 2A and 2B illustrate an example converged infrastructure 200 that may be implemented as a computing node 118 of the distributed computing environment 114 according to the teachings of the present disclosure. For example, multiple converged infrastructures 200 as described herein may be configured to communicate with one another using a communication network, such as the communication network 130 to form at least a portion of the distributed computing environment 114.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual elements 112 and services provided by those virtual elements. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is located in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the graph database management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204*a*, virtual storage objects 204*b*, and virtual switch objects 204*c*) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
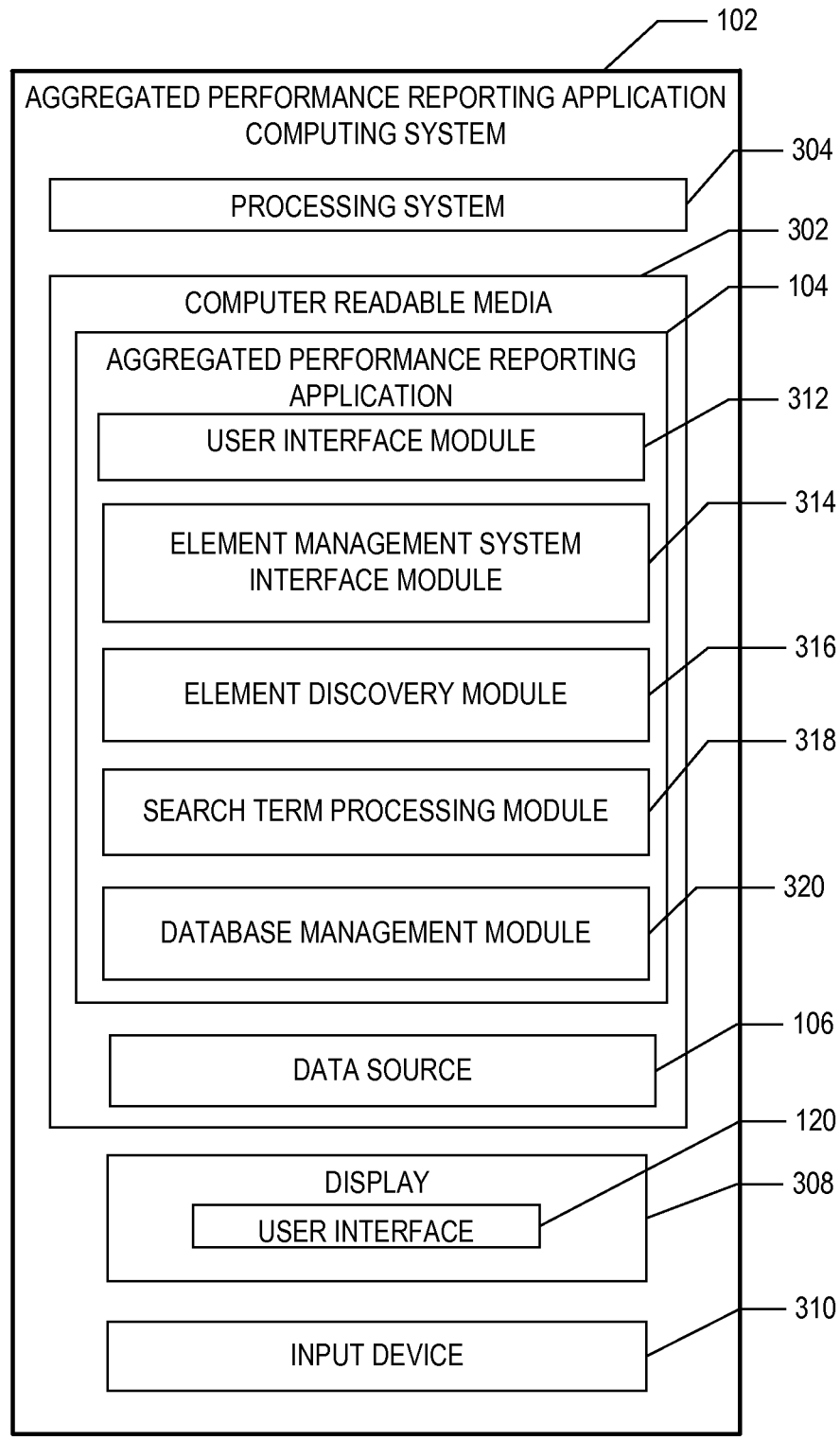
FIG. 3 illustrates a block diagram of an example graph database management application executed on the graph database management application computing system according to one embodiment of the present disclosure.

Referring now in more detail to FIG. 3, a block diagram of an example graph database management application 104 executed on the graph database management application computing system 102, is depicted according to one aspect of the present disclosure. The graph database management application 104 is stored in a computer readable media 302 and executed on a processing system 304 of the computing system 102. The processing system 304 is hardware. The computing system 102 may include any type of computing system, such as one or more management computing systems, personal computers, mobile computers and/or other mobile devices, and other hosts.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

According to one aspect, the graph database management application computing system 102 also provides the user interface 120, such as a graphical user interface (GUI) or a command line interface (CLI), which is displayed on a display 308, such as a computer monitor, for displaying data. The graph database management application computing system 102 also includes an input device 310, such as a keyboard or a pointing device (e.g., a mouse, trackball, pen, or touch screen) to enter data into or interact with the user interface 120. According to one aspect, the graph database management application 104 includes instructions or modules that are executable by the processing system 304 as will be described in detail herein below.

Figure 4A:
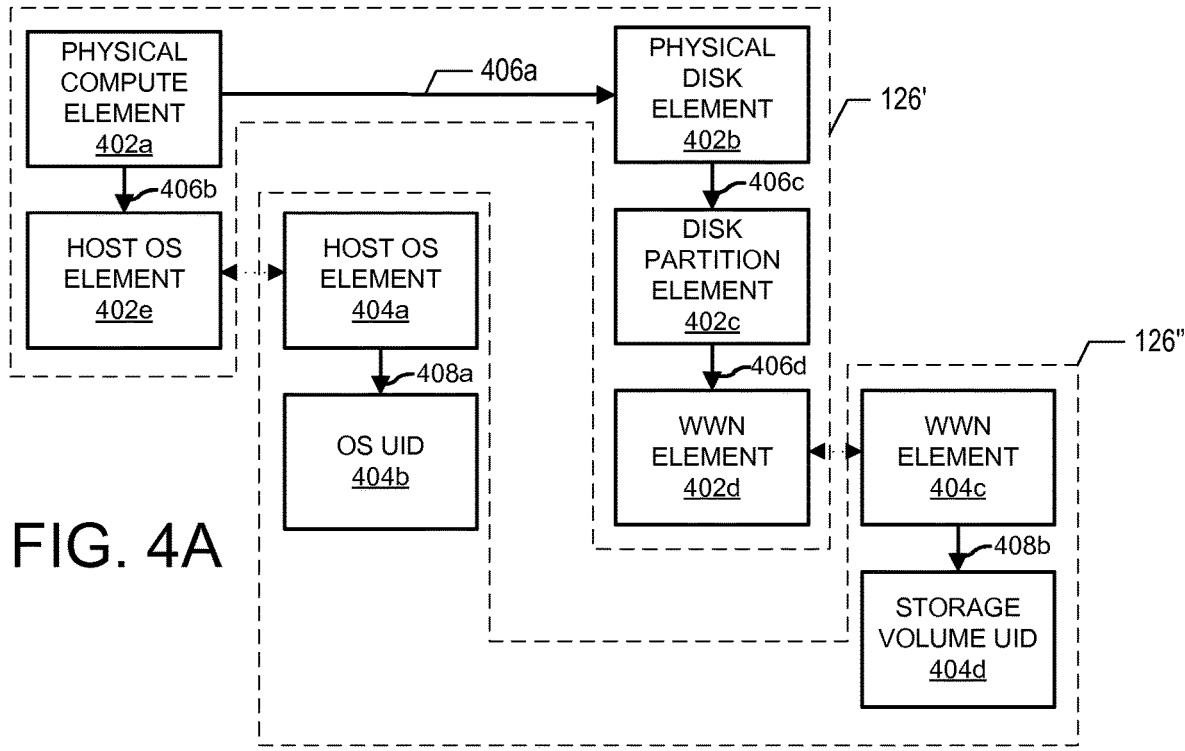
FIGS. 4A and 4B illustrate element records provided by multiple element management systems, and a portion of a graph database that may be generated by the application, respectively, according to one embodiment of the present disclosure.
Figure 4B:
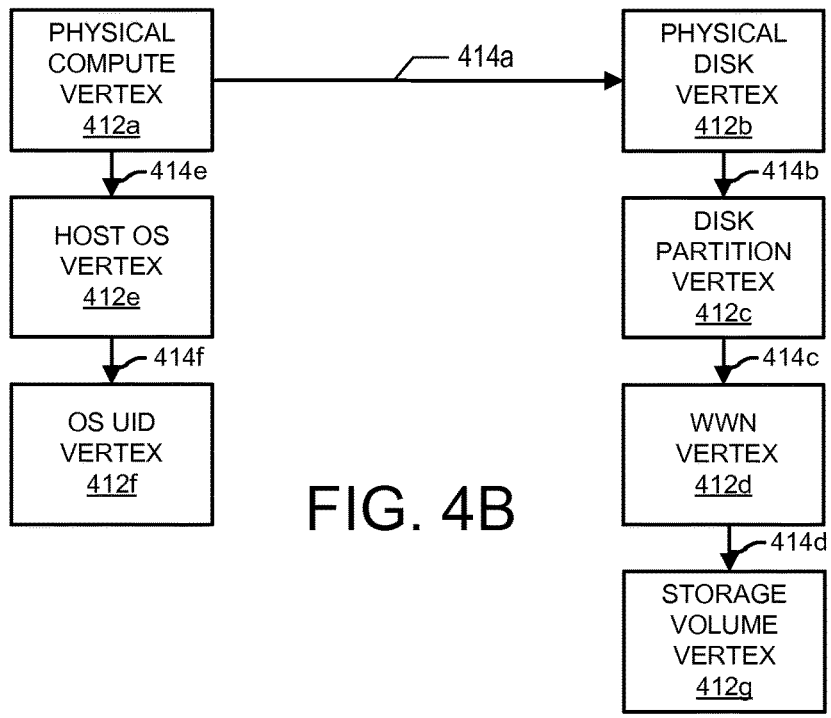

A user interface module 312 generates the user interface 120 to facilitate receipt of input data and/or output data from or to a user. The user interface module 312 may display information to, and receive user information from the user in any suitable form, such as via a graphical user interface (GUI) or a command line interface (CLI). In one embodiment, the user interface module 312 may display an entry field for receiving a search term from the user as shown in FIG. 4A, and one or more other screens for displaying a response the entered search term such as shown in FIGS. 4B and 4C. Nevertheless, other embodiments contemplate that the user interface module 312 may display any type and number of input fields for receiving user input and displaying responses to the user input. For example, the user interface module 312 may display multiple entry fields to receive multiple search terms from the user along with one or more other entry fields for receiving user input on how the fields are to be combined, such as logic for combining multiple search terms using one or more Boolean operators.

An element management system interface module 314 provides an interface to one or more element management systems 126 for transmitting and receiving information about the distributed computing environment 114, and/or other information associated with operation of the system. For example, the element management system interface module 314 may communicate with the element management system 126 to receive information about each element 112 for generating the element records 122 that are stored in the data source 106. The information may include identification information that may be used to query the element directly to receive parametric information that may be stored in the element records, or alternatively; the information may include some, most, or all parametric information that may be stored in the element records.

An element discovery module 314 performs a discovery process on an ongoing, periodic basis so that the element records 122 may be maintained in an up-to-date condition. For example, the element discovery module 314 may poll one or more element management systems 126 to determine whether any elements 112 have been added, deleted, and/or modified, and if so, perform a discovery process with those elements 112 and update their information in the element records 122. As another example, the element managers may be configured to automatically notify the element discovery module 314 whenever an element 112 is added, deleted, and/or modified such that the element discovery module 314 is triggered to perform a discovery process on those elements 112.

A search term processing module 318 processes search terms obtained from the user interface module 312 to search the graph database 108 for vertices 110 that match those search terms. In one embodiment, the search term processing module 318 communicates with a commercial-off-the-shelf (COTS) search engine, such as the Elasticsearch™ search engine or Titan™ software program, to query the graph database 108, and receive response to those queries. In other embodiments, the search term processing module 318 may communicate directly with the graph database 108 to obtain vertices 110 and their associated edges 116.

A database management module 320 manages various functions of the graph database, such as formatting information about each element to generate the element records 122 that are stored in the graph database 108, updating information in each vertex 110, deleting obsolete vertices 110, and the like. In one embodiment, the database management module 320 includes an Titan™ software program that creates and manages graph databases, such as the graph database 108 described above.

It should be appreciated that the modules described herein are provided only as examples, and that the graph database management application 104 may have different modules, additional modules, or fewer modules than those described herein. For example, one or more modules as described in FIG. 3 may be combined into a single module. As another example, certain modules described herein may be encoded on, and executed on other computing devices, such as on one of the hosts 202 of a converged infrastructure 200 as described above with reference to FIGS. 2A and 2B.

FIGS. 4A and 4B illustrate element records 402, 404 provided by multiple element management systems 126, and a portion of a graph database 410 that may be generated by the application 104, respectively, according to one embodiment of the present disclosure. In particular, FIG. 4A illustrates how the application 104 may correlate the vertices 110 obtained from different element management systems 126 to form multi-step (e.g., chained) edges 116 representing the relationships among the elements 112 of the distributed computing environment 114. In general, vertices 402a-402f represent elements 112 of a distributed computing environment 114 identified by a first element management system 126' (e.g., the vCenter™ element management system), while vertices 404a-404d represent elements 112 of the distributed computing environment 114 identified by a second element management system 126" (e.g., Vision™ element management system). As will be described in detail herein below, the application 104 may combine the element information from multiple element management systems 126 to generate the graph database 108.

The application 104 may use certain element management systems 126 in order to obtain information about the elements 112 of a distributed computing environment 114 and any relationships that the elements 112 may have among each other. Nevertheless, many element management systems 126 used today are often limited to a pre-determined domain. For example, the vCenter™ element management system 126 is well adapted to management of hardware resources (e.g., physical hosts) of a virtualized computing environment, and the virtual objects executed on those hardware resources, but limited in its ability to identify those resources related to certain processes (e.g., applications or services). Conversely, the Vision™ element management system is well adapted to management of resources related to a particular process, but is limited in its ability to identify specific hardware resources used to execute those processes.

In the particular example shown, the first element management system 126' has element information including a physical disk element 402b having a relationship 406a with the physical compute element 402a. The physical computing element 402a has a relationship 406b with the host OS element 402e. Further, the physical disk element 402b has a relationship 406c with the disk partition element 402c, which in turn has a relationship 406d with the world wide number (WWN) element 402d. The second element management system 126" has element information including a host OS element 404a that has a relationship 408a with an OS unique identification (UID) element 404b, and a WWN element 404c that has a relationship 408b with a storage volume element 404d. The world wide number (WWN) element 402d and the WWN element 404c may be referred to as shadow nodes, which can be combined with the storage volume element 404d to have an element type of storage volume. The fact that the world wide number (WWN) element 402d and the WWN element 404c can be combined allows the two graph segments to be joined.

The application 104 combines the elements 112 provided from each of the first and second element management systems 126 to generate a seamless, traversable graph database as shown in FIG. 4B. In one aspect, certain vertices may be generated incrementally since the immediate context of each element is identifiable from a single source (e.g., a disk enclosure element includes a set of disk elements). In that case, the disk elements and their enclosure can inherently "reference" each other using common terminology and/or identifiers provided by a single element management system 126. In general, the application 104 may generate vertices and edges using element and relationship information included from each element management system 126.

For example, the application 104 generates vertices 412a, 412b and edges 414b using element and relationship information provided for the compute element 402a and its relationship with the host OS element 402e and physical disk element 402b. The application 104 also generates vertices 412b, 412c and edge 414b using information provided for the physical disk element 402b and its relationship with the disk partition element 402c from the first element management system 126. The application 104 also generates vertex 412d and edge 414c using element and relationship information provided for the disk partition element 402c and its relationship with the WWN element 402d by the first element management system 126.

The application 104 may also generate vertices and edges using information directly provided by the second element management system 126. For example, the application 104 may also generate vertex 412f and edge 408a using element and relationship information provided for the host OS element 404a and its relationship with the OS UID element 404b. The application 104 may also generate vertex 412g and edge 414c using element and relationship information provided for the WWN element 404c and its relationship with the storage volume element 404d from the second element management system 126.

Nevertheless, a problem arises due to the different domains managed by each of the first and second element management systems 126. For example, the two domains might refer to the same physical element by two different, domain-specific names; that is, the first element management system might refer to a USB storage element as a dual inline memory module (DIMM), while the second element management system refer to that device a memory device. In order for the graph database 108 to be seamless, and traversable, the application 104 accesses domain translation records 124 stored in the data source 106 to identify those elements 112 that represent the same element 112 and merges the elements 112 into a single vertex and/or generate a shadow vertices for each of the elements 112 representing the same element 112 with edges to any other adjacent elements 112.

For example, the application 104 may merge the elements 402e and 404a into a single vertex 412e, and elements 402d and 404c into a single vertex 412d. Thus, the resulting graph database 410 may be accessed to identify any chain relationships that certain elements 112 may have relative to the other elements of the distributed computing environment 114.

Figure 5:
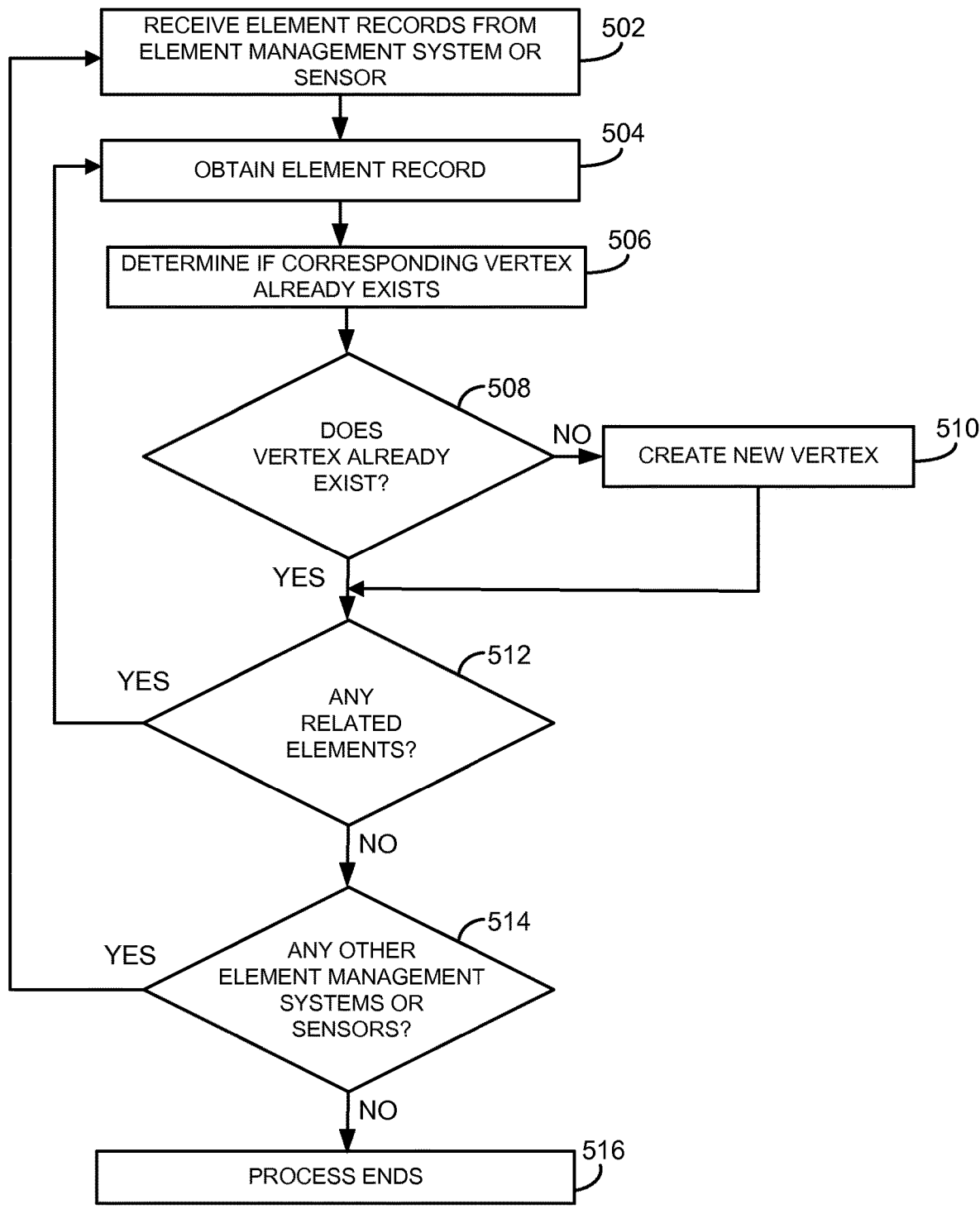
FIG. 5 illustrates an example process that is performed by the graph database management system according to one embodiment of the present disclosure.

FIG. 5 illustrates an example process 500 that is performed by the application 104 for generating a graph database 108 using one or more element management systems 126 and optionally one or more sensors 128.

In step 502, the application 104 receives element information and its respective relationship information from a distributed computing environment 114. The element information and relationship information may be obtained from any suitable source. In one embodiment, the element information and relationship information may be obtained from one or more element management systems 126 that are adapted to manage the operation of the elements 112 of the distributed computing environment 114. In another embodiment, the element information and relationship information may be obtained from one or more sensors 128, such as a network analyzer, that monitors communication traffic among the various elements 112 of the distributed computing environment 114.

In step 504, the application 104 obtains an element record 122 from the received element information. The application 104 then determines whether a corresponding vertex 110 for that element record 122 exists in the graph database 108 in step 506. For example, the application 104 may perform a search through the graph database 108 to determine whether a vertex having the same UID, serial number, WWN, and/or element type currently exists in the graph database 108. In one embodiment, the application 104 may access an domain translation record 124 stored in the data source 106 to translate the nomenclature of any identifying information provided in the element record 122 to the nomenclature used by other element management systems 126 and/or sensors 128. For example, the domain used by one particular element management system 126 may use the term 'storage volume' to describe a hard disk device, while the domain of another element management system 126 may use the term 'persistent storage'. In such a case, the application 104 may translate the term 'storage volume' to 'persistent storage' and perform a search through the graph database 108 to determine whether a corresponding vertex 110 currently exists for the element record 122. An another example, the application 104 may generate a shadow vertices for each of the elements 112 representing the same element 112 with edges to any other adjacent elements 112.

In step 508, if no corresponding vertex 110 currently exists for the element record, one is generated in step 510. However, if a corresponding vertex 110 is found to exist in the graph database 108, processing continues at step 512.

In step 512, the application 104 determines whether any relationship information and associated element information exists for the subject element record 122. If so, processing continues at step 506 to determine if that related vertex exists, and if not, add a corresponding vertex 110 for that related element record 122. However, if no related additional related element records 122 exists for the subject element record 122, processing continues at step 504 to obtain and process the next element record 122 and its associated relationship information from the element management system.

Once all the element records 122 have been processed for the first element management system 126 and/or sensor(s) 128, the element records 122 from other element management system 126. That is, the application 104 may determine whether any element information and relationship information from another element management system 126 is to be processed in step 514. If so, processing continues at step 502 to obtain and process element information and associated relationship information from another element management system 126 or sensor 128. However, if no further element management systems 126 or sensors 128 are to be processed, processing continues at step 516 in which the process ends.

Although FIG. 5 describes one example of a process that may be performed by the system for calculating and displaying a graph database for the elements of a distributed computing environment, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

Figure 6A:
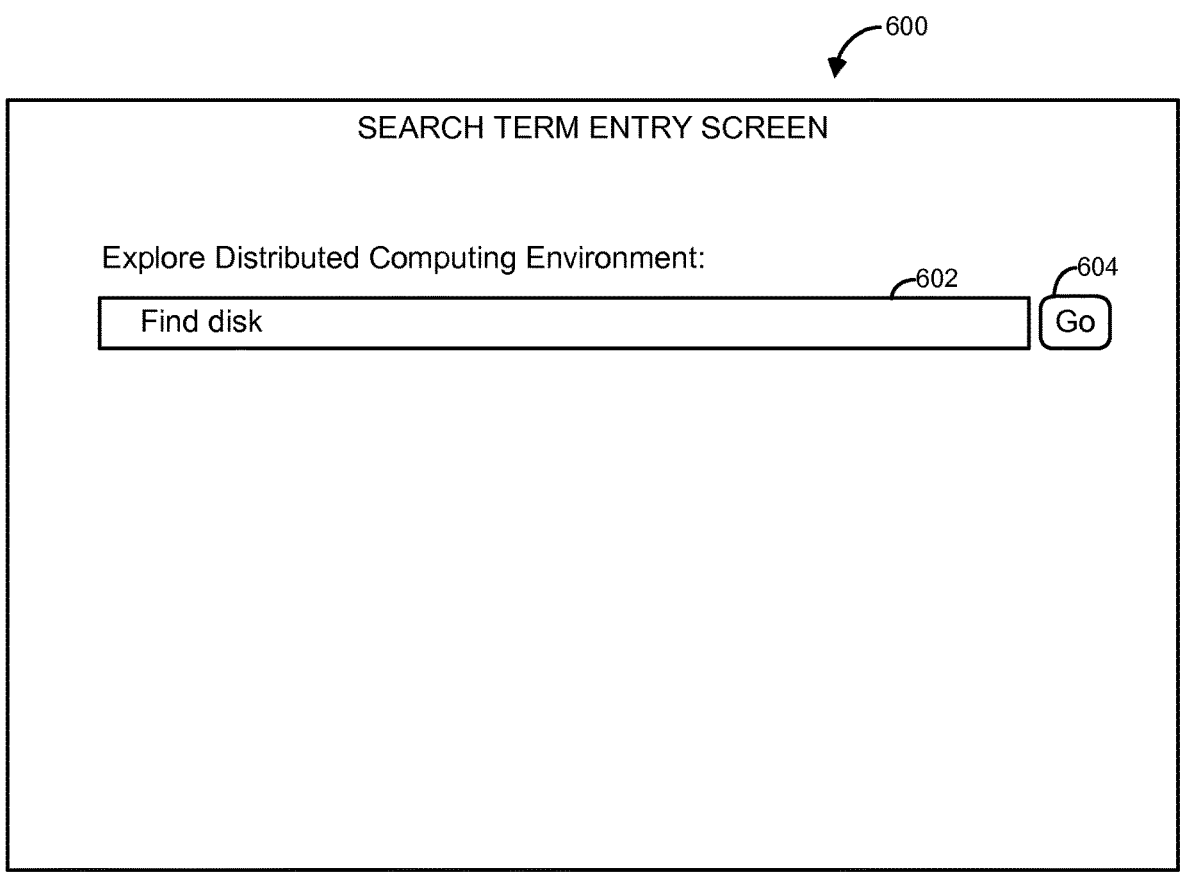
FIGS. 6A through 6C illustrate example screenshots that may be displayed by the graph database management application according to one embodiment of the present disclosure.
Figure 6B:
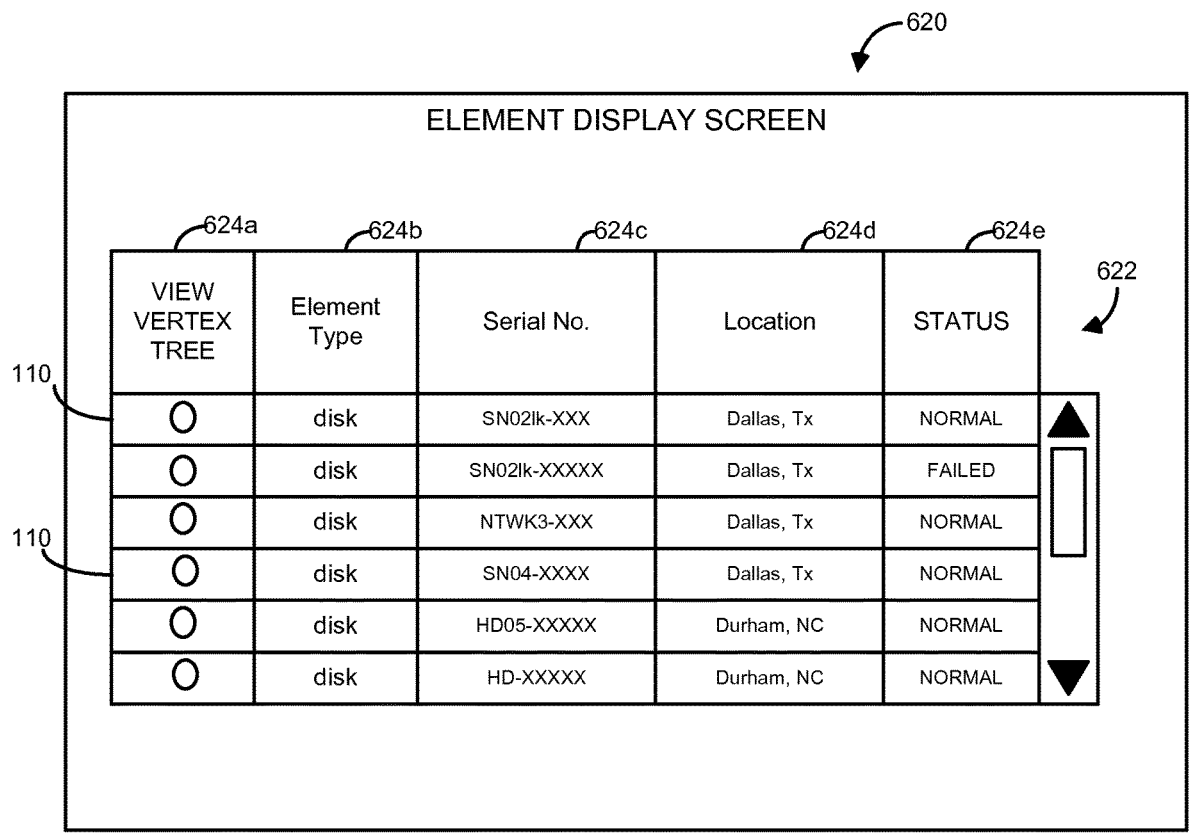
Figure 6C:
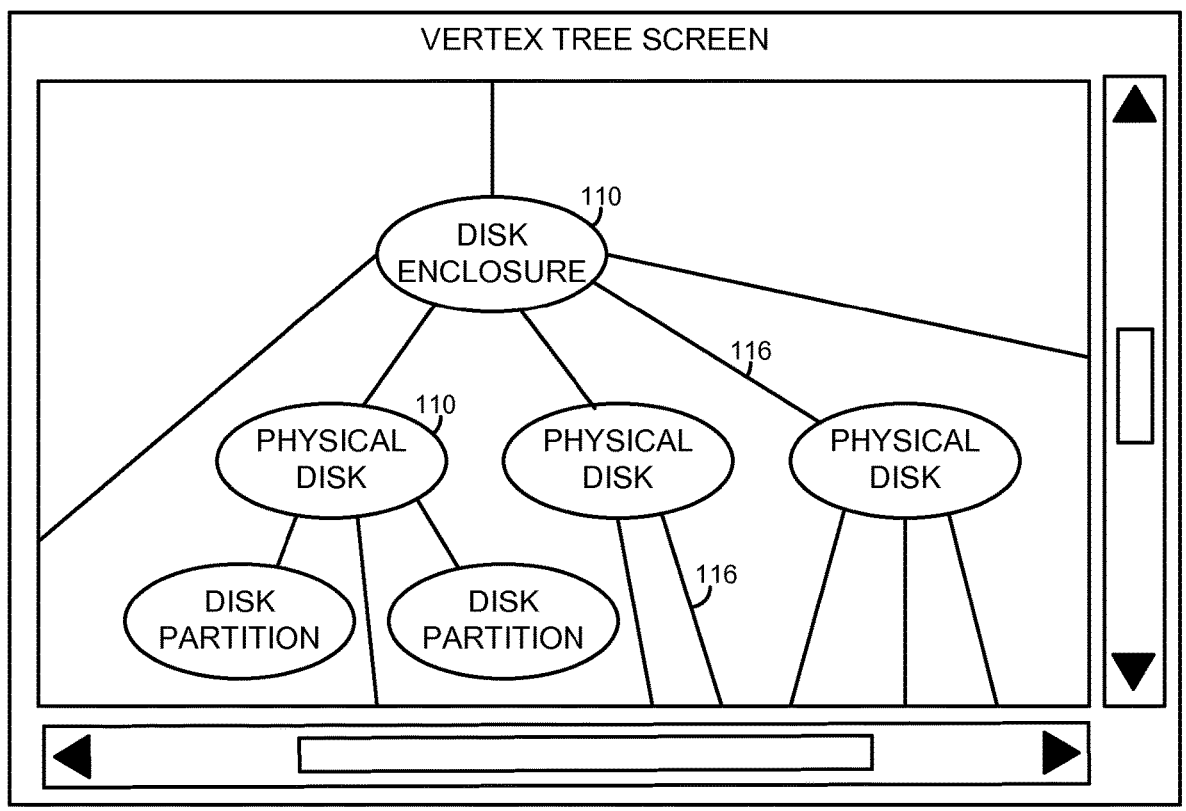

FIGS. 6A through 6C illustrate example screenshots that may be displayed by the graph database management application 104 for displaying vertices and edges of a graph database on a display, such as the user interface 120 of FIG. 1. In general, FIG. 6A is a search term entry screen 600 that may be used to receive one or more search terms from the user, FIG. 6B is a vertex list screen 620 for displaying a list of vertices matching the search term entered in the search term entry screen 600, and FIG. 6C is a graph database display screen 640 for displaying the details of the graph database 108 generated by the application 104 according to one embodiment of the present disclosure.

Referring initially to FIG. 6A, the search term entry screen 600 includes an entry field 602 for entering one or more search terms, and a 'go' button 604 for submitting the entered search terms to the application 104. As shown, the search term 'find disk' has been entered in the entry field 602; nevertheless, it should be understood that any free form text string may be entered into the entry field 600. The entry field 602 supports entry of a single search term or the entry of multiple search terms that are separated by one or more Boolean operators, such as 'AND', 'OR', 'ANDNOT', 'ORNOT', and the like. Additionally the entry field 602 supports entry of a phrase including a structure sequence of multiple words, such as "compute array devices." Once the search term(s) have been entered, the 'go' button 604 may be selected for submitting the search term(s) to the application 104.

Once the search term(s) have been submitted, the vertex list screen 620 (FIG. 6B) may be displayed. In general, the vertex list screen 620 displays a list of the generated vertices 110 in list form. The vertex list screen 620 a vertex list 622 in which the vertices 110 are arranged in rows and various parameters associated with each vertex 110 are arranged in columns. The vertex list 622 includes an 'view vertex tree' column 624a, an 'element type' column 624b, a 'serial number' column 624c, a 'location' column 624d, and a 'status' column 624e. The 'element type' column 624b indicates the element type of its respective element record 122. The 'serial number' column 624c indicates a serial number associated with each element record 122 and is essentially a unique identifier associated with its respective element record 122. The 'location' column 624d indicates the location that the element associated with the element record 122 is located at, while the 'status' column 624e indicates whether its respective element 112 is operating state or is in a failed state. Although the example vertex list 622 shown herein has an 'element type' column 624b, a 'serial number' column 624c, a 'location' column 624d, and a 'status' column 624e, other example element record lists may include additional, fewer, or different types of parameters than shown above.

The 'view vertex tree' column 624a includes radio buttons for each vertex 110 such that, when selected by the user, causes the application 104 to generate an vertex tree screen 640 to be displayed as shown in FIG. 6C. In general, the vertex tree screen 640 displays the selected vertex along with any other vertices 110 related to the selected vertex 110. In this manner, the user may be able to traverse across the tree upwards, downwards, or side-to-side to visualize other vertices that may be related to the selected vertex. For example, an administrator performing diagnosis of a particular problem on one element, may using the application 104 identify any related elements that may be a cause of the problem in a relatively quick and efficient manner. Additionally, use of the application 104 may aid in detecting performance issues such as overloading that may occur when too many or too few resources are consumed by one or a few elements. For example, the user may use the application 104 to quickly identify some, most, or all of the resources used by certain elements and trace their origin to identify how those resources were allocated to the subject elements, thus enabling efficient management of the elements of the distributed computing environment 114 in a timely, efficient manner.

Although FIGS. 6A through 6C illustrate example screens that may be used for receiving user input for searching for vertices 110 of the graph database 108 and displaying the graph database 108, the application 104 may display additional, fewer, or different screens or information included in those screens without departing from the spirit and scope of the present disclosure. For example, the application 104 may display other screens for facilitating management of individual elements 112, such as one that provides for configuration of certain parameters (e.g., allocated memory, quantity of processors, configuration of any ports, etc.) based upon the parametric values displayed by the application 104.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

For example, FIG. 7 is a block diagram illustrating an example of a host or computer system 700 which may be used in implementing the embodiments of the present disclosure. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 713 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages.

The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. A graph database management method for a distributed computing environment, the method comprising:
   receiving, from one or more nodes in the distributed computing environment, element records associated with one or more computing devices that perform a function for an operation of the distributed computing environment;
   generating, using instructions stored in a non-transitory, computer-readable medium and executed on at least one hardware processor, a graph database having a plurality of vertices representing a plurality of element records of the distributed computing environment and at least one edge representing a specified relationship between at least one pair of the element records, wherein the specified relationship is one or more of a physical or a logical relationship between the element records;
   obtaining a first element record representing a first computing device of the one or more computing devices and a second element record representing a second computing device of the one or more computing devices, the first element record obtained from a first element management system configured to obtain information associated with physical resources of the distributed computing environment and the second element record obtained from a second element management system configured to obtain information associated with services executed by the one or more computing devices of the distributed computing environment and different than the first element management system;
   based on identifying that the first computing device performs a same type of function within the distributed computing environment as the second computing device and a domain translation record associated with the first computing device, translating at least a portion of information included in the first element record to a format of the second element record;
   generating, based on the translated portion of information of the first element record matching a portion of the second element record, a new vertex of the graph database, the new vertex corresponding to a merging of a first vertex corresponding to the first element record with a second vertex corresponding to the second element record, wherein merging the first vertex and the second vertex produces a relationship including a chain of resources within a plurality of sources;
   receiving, using the instructions, a request to view the vertices associated with the at least one pair of the element records associated with the one or more computing devices of the distributed computing environment and an associated edge; and
   facilitating, using the instructions, a display of the vertices and their associated edge on a display in response to the request, wherein displaying the associated edge identifies the one or more of the physical or the logical relationship between the at least one pair of the element records associated with the one or more computing devices based on the relationship in order to enable management of the one or more computing devices within the distributed computing environment between the plurality of sources.

2. The graph database management method of claim 1, further comprising generating at least one of the vertices using element information and its associated relationship information obtained from a network analyzer.

3. The graph database management method of claim 1, further comprising generating at least one of the vertices using element information and its associated relationship information obtained from an element management system.

4. The graph database management method of claim 1, further comprising generating the graph database using a graph database software program.

5. The graph database management method of claim 1, further comprising performing a discovery process to obtain the element records, wherein the discovery process dynamically updates the plurality of element records of the distributed computing environment.

6. A graph database management system for a distributed computing environment, the graph database management system comprising:
   one or more nodes in the distributed computing environment; and
   a computing system in communication with the one or more nodes, the distributed computing environment comprising a plurality of elements and a database that stores element records associated with corresponding elements of the distributed computing environment, the computing system comprising at least one hardware processor and at least one memory to store instructions that are configured to, when executed by at least one processor to:
   receive, from the one or more nodes, element records associated with one or more computing devices that perform a function for an operation of the distributed computing environment;
   generate a graph database having a plurality of vertices representing a plurality of element records of the distributed computing environment and at least one edge representing a specified relationship between at least one pair of the element records, wherein the specified relationship is one or more of a physical or a logical relationship between the element records;
   obtain a first element record representing a first element of the plurality of elements and a second element record representing a second element of the plurality of elements, the first element record obtained from a first element management system configured to obtain information associated with physical resources of the distributed computing environment and the second element record obtained from a second element management system configured to obtain information associated with services executed by the one or more computing devices of the distributed computing environment and different than the first element management system;

based on identifying that the first element performs a same type of function within the distributed computing environment as the second element and a domain translation record associated with the first element, translating at least a portion of information included in the first element record to a format of the second element record;

generate, based on the translated portion of information of the first element record matching a portion of the second element record, a new vertex of the graph database, the new vertex corresponding to a merging a first vertex corresponding to the first element record with a second vertex corresponding to the second element record, wherein merging the first vertex and the second vertex produces a relationship including a chain of resources within a plurality of sources;

receive a request to view the vertices associated with the at least one pair of the element records associated with the one or more computing devices of the distributed computing environment and an associated edge; and facilitate a display of the vertices and their associated edge on a display in response to the request, wherein displaying the associated edge identifies the one or more of the physical or the logical relationship between the at least one pair of the element records associated with the one or more computing devices based on the relationship in order to enable management of the one or more computing devices within the distributed computing environment between the plurality of sources.

7. The graph database management system of claim 6, wherein the instructions are further executed to generate at least one of the vertices using element information and its associated relationship information obtained from a network analyzer.

8. The graph database management system of claim 6, wherein the instructions are further executed to generate at least one of the vertices using element information and its associated relationship information obtained from an element management system.

9. The graph database management system of claim 6, wherein the instructions are further executed to generate the graph database using a graph database software program.

10. The graph database management system of claim 6, wherein the instructions are further executed to perform a discovery process to obtain the element records, wherein the discovery process dynamically updates the plurality of element records of the distributed computing environment.

11. A non-transitory, computer readable storage medium, having embodied thereon a program that, when executed by at least one hardware processor, is configured to perform at least the following:

receiving, from one or more nodes in a distributed computing environment, element records associated with one or more computing devices that perform a function for an operation of the distributed computing environment;

generating a graph database having a plurality of vertices representing a plurality of element records of the distributed computing environment and at least one edge representing a specified relationship between at least one pair of the element records, wherein the specified relationship is one or more of a physical or a logical relationship between the element records;

obtaining a first element record representing a first computing device of the one or more computing devices and a second element record representing a second computing device of the one or more computing devices, the first element record obtained from a first element management system configured to obtain information associated with physical resources of the distributed computing environment and the second element record obtained from a second element management system configured to obtain information associated with services executed by the one or more computing devices of the distributed computing environment and different than the first element management system;

based on identifying that the first computing device performs a same type of function within the distributed computing environment as the second computing device and a domain translation record associated with the first computing device, translating at least a portion of information included in the first element record to a format of the second element record;

generating, based on the translated portion of information of the first element record matching a portion of the second element record, new vertex of the graph database, the new vertex corresponding to a merging of a first vertex corresponding to the first element record with a second vertex corresponding to the second element record, wherein merging the first vertex and the second vertex produces a relationship including a chain of resources within a plurality of sources;

receiving a request to view the vertices associated with the at least one pair of the element records associated with the one or more computing devices of the distributed computing environment and an associated edge; and facilitating a display of the vertices and their associated edge on a display in response to the request, wherein displaying the associated edge identifies the one or more of the physical or the logical relationship between the at least one pair of the element records associated with the one or more computing devices based on the relationship in order to enable management of the one or more computing devices within the distributed computing environment between the plurality of sources.

12. The non-transitory, computer-readable storage medium of claim 11, further operable to perform generating at least one of the vertices using element information and its associated relationship information obtained from a network analyzer.

13. The non-transitory, computer-readable storage medium of claim 11, further operable to perform generating at least one of the vertices using element information and its associated relationship information obtained from an element management system.

14. The non-transitory, computer-readable storage medium of claim 11, further operable to perform generating the graph database using a graph database software program.

\* \* \* \* \*